(No Model.)

R. BURTON.
SLOP BUCKET.

No. 319,388. Patented June 2, 1885.

WITNESSES:
Fred. G. Dieterich
Wm. Bagger

Reuben Burton
INVENTOR.
by Louis Bagger & Co.
ATTORNEYS.

United States Patent Office.

REUBEN BURTON, OF RICHMOND, VIRGINIA.

SLOP-BUCKET.

SPECIFICATION forming part of Letters Patent No. 319,388, dated June 2, 1885.

Application filed March 30, 1885. (No model.)

*To all whom it may concern:*

Be it known that I, REUBEN BURTON, a citizen of the United States, and a resident of Richmond, in the county of Henrico and State of Virginia, have invented certain new and useful Improvements in Slop-Buckets; and I do hereby declare that the following is a full, clear, and exact description of the invention, which will enable others skilled in the art to which it appertains to make and use the same, reference being had to the accompanying drawings, which form a part of this specification, and in which—

Figure 1:
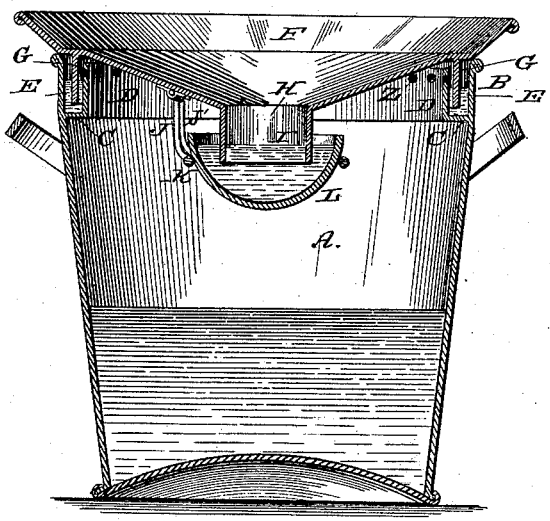
Figure 2:
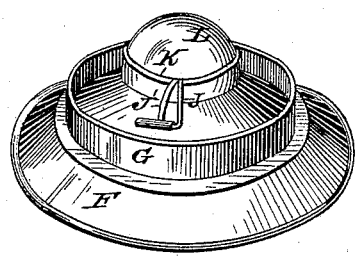
Figure 3:
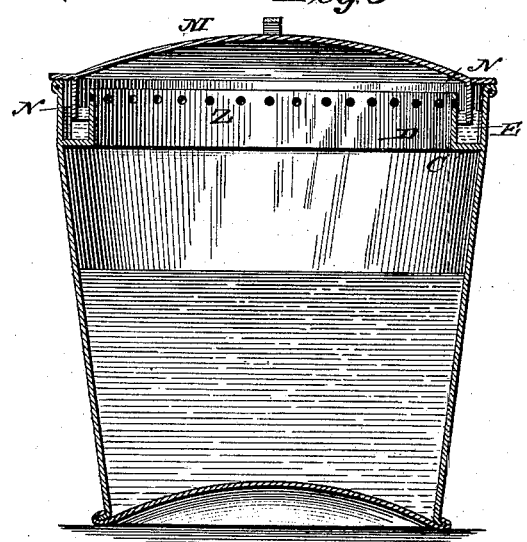
Figure 4:
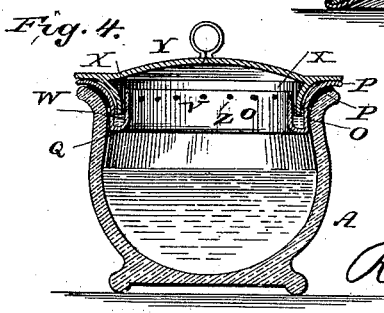

Figure 1 is a vertical sectional view of a slop or chamber bucket to which my invention has been applied. Fig. 2 is a perspective view of the cover detached from the same in an inverted position. Fig. 3 is a vertical sectional view showing my invention applied to an ordinary covered slop-bucket, and Fig. 4 is a vertical sectional view showing my invention applied detachably to a chamber-vessel.

The same letters refer to the same parts in all the figures.

This invention relates to slop-buckets, chamber-vessels, and other waste-receptacles; and it has for its object to provide such vessels or receptacles with an air-tight cover closed by a water seal, and slop-buckets also with a water-trap, which shall prevent the escape of the odor of the contents of the vessel, substantially as will be hereinafter more fully described, and particularly pointed out in the claims.

In the drawings hereto annexed, A designates a slop-bucket to which my invention has been applied. The neck B of the said bucket is provided near its lower edge with an interior annular flange, C, to which is secured an annular rim or collar, D, which is somewhat lower than the neck B, as will be seen in the drawings, thus forming an annular groove, E, in which water may be placed for the purpose of forming a seal.

F is a cover, which is provided with an annular downwardly-extending collar, G, adapted to enter the groove E and the water placed therein, thus closing the vessel to which it is applied. This cover is made concave and provided with a central opening, H, having a downwardly-extending annular rim or collar, I. To the under side of the cover is also secured a bracket, J, having a ring, K, supporting a concave pan, L, into which the rim or collar I extends, so that water contained in the said pan will form a seal. This bracket is removable, having an arm that slips into a socket, and is held in position by a spring, J'.

The operation of this invention will be readily understood. Water having been placed in the groove E, the cover is placed in position. When waste water is emptied into the bucket through the opening H, a portion of it will remain in the trap-pan L, thus forming a seal, which, in connection with the water seal in the groove E, will effectually prevent the escape of noxious odors from the bucket.

In Fig. 3 of the drawings I have shown my invention applied to an ordinary slop-bucket having a solid cover, M, provided with a collar, N, to enter the groove E. The construction is the same as already described, with the exception that the central opening in the cover and the trap attached thereto are dispensed with.

In Fig. 4 of the drawings I have illustrated a modification of my invention, which consists in the application to chamber-vessels, slop-buckets, and the like of a separate and detachable annular rim or collar, O, having at its upper edge an annular flange, P, adapted to rest upon the upper edge of the vessel to which it is applied, a packing-ring of rubber or other material being interposed, as shown at P, for the purpose of forming a tight joint. The lower edge of the said rim or collar is provided with an annular flange, Q, to which an upwardly-extending rim, V, is secured, thereby forming an annular groove, W, to receive the downwardly-extending collar X of the cover Y, and in which water is to be placed for the purpose of forming a water seal. The operation of this device is similar to that already described, and it has the additional advantage that it may be readily attached to any vessels of ordinary construction.

In all cases I prefer to provide the inner rim of the water seal with perforations at some distance from the bottom, as shown at Z in the drawings, in order to avoid splashing.

Having thus described my invention, I claim and desire to secure by Letters Patent of the United States—

1. The combination, with an air-tight cover for vessels having a downwardly-extending flange around the central aperture, of a water-pan hinged to said cover by means of a removable bracket, and a spring to retain said bracket and water-pan in position beneath said flange around said aperture, substantially as and for the purpose set forth.

2. The combination, with a slop-bucket or like receptacle, of a detachable rim or ring having an annular flange at its upper end, an interior annular flange forming an annular groove, and a cover having a downwardly-extending rim adapted to enter the said groove, substantially as and for the purpose set forth.

In testimony that I claim the foregoing as my own I have hereunto affixed my signature in presence of two witnesses.

REUBEN BURTON.

Witnesses:
EDWARD S. ROSE,
HENRY TAYLOR, Jr.